(12) United States Patent
Hasegawa

(10) Patent No.: US 8,448,737 B2
(45) Date of Patent: May 28, 2013

(54) SADDLE-RIDE TYPE VEHICLE

(75) Inventor: Junko Hasegawa, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 763 days.

(21) Appl. No.: 12/636,859

(22) Filed: Dec. 14, 2009

(65) Prior Publication Data

US 2010/0163328 A1    Jul. 1, 2010

(30) Foreign Application Priority Data

Dec. 26, 2008   (JP) ................................. 2008-334186

(51) Int. Cl.
*B62M 7/00*   (2010.01)
*B62K 11/00*  (2006.01)

(52) U.S. Cl.
USPC ........................................................ 180/219

(58) Field of Classification Search
USPC ......................... 180/219; 296/37.15; 280/835
See application file for complete search history.

(56) References Cited

U.S. PATENT DOCUMENTS

| 4,915,188 A * | 4/1990 | Ota et al. ....................... 180/219 |
| 6,547,024 B2 * | 4/2003 | Ohyama et al. ................ 180/227 |
| 6,941,206 B2 * | 9/2005 | Hasegawa et al. .............. 701/38 |
| 7,134,706 B2 * | 11/2006 | Michisaka et al. .......... 296/97.22 |
| 7,422,084 B2 * | 9/2008 | Mochizuki et al. ........... 180/227 |
| 7,562,734 B2 * | 7/2009 | Yano et al. ..................... 180/219 |
| 7,794,002 B2 * | 9/2010 | Yano et al. ................... 296/37.15 |
| 7,798,273 B2 * | 9/2010 | Shimozato et al. ........... 180/227 |
| 2010/0243354 A1 * | 9/2010 | Inaoka .......................... 180/69.4 |

FOREIGN PATENT DOCUMENTS

| EP | 1296036 A2 | 3/2003 |
| EP | 1304283 A1 | 4/2003 |
| EP | 18649000 A1 | 12/2007 |
| JP | 04372484 A * | 12/1992 |
| JP | 05-124560 A | 5/1993 |
| JP | 10324281 A * | 12/1998 |

\* cited by examiner

*Primary Examiner* — Paul N Dickson
*Assistant Examiner* — Daniel Yeagley
(74) *Attorney, Agent, or Firm* — Westerman, Hattori, Daniels & Adrian, LLP

(57) ABSTRACT

A saddle-ride type vehicle is provided which arranges a canister therein, taking heat from an engine into consideration. The saddle-ride type vehicle includes a storage box which has a bulging portion; an engine; a fuel tank; and a canister, the engine is arranged behind the bulging portion in the vehicle longitudinal direction, and the fuel tank and the canister are arranged in front of the bulging portion in the vehicle longitudinal direction. The fuel tank and the canister are arranged with respect to the engine such that the bulging portion of the storage box is sandwiched between the fuel tank canister and the engine. It is possible to arrange the canister away from the engine by a distance corresponding to the bulging portion and hence, it is possible to reduce influence of heat from the engine exerted on the canister.

17 Claims, 5 Drawing Sheets

SADDLE-RIDE TYPE VEHICLE

TECHNICAL FIELD

The present invention relates to a saddle-ride type vehicle provided with a canister.

BACKGROUND OF THE INVENTION

To collect vaporized fuel in a fuel tank, a canister is communicably connected to the fuel tank. Fuel which is collected by the canister is fed to an engine by way of a carburetor. A vaporizing device of a scooter provided with such a canister is known (see JP-A-5-124560, for example).

In JP-A-5-124560, there is the description that a large negative pressure is applied to an intake side of a carburetor at the time of rapid acceleration of a scooter or the like and hence, the negative pressure is transmitted to the inside of a canister by way of a purge hose, a vaporized fuel gas accumulated in the canister is sucked into the carburetor through the purge hose, and is fed to the engine and is burnt. Accordingly, an air/fuel mixture becomes rich temporarily thus enhancing the acceleration property of the scooter.

According to JP-A-5-124560, the canister is arranged close to an engine unit. In this case, to maintain the collection performance of the canister, it is desirable to block heat from the engine.

SUMMARY OF THE INVENTION

It is an object of the present invention to provide a saddle-ride type vehicle which arranges a canister by taking heat from an engine into consideration.

An embodiment of the invention is characterized in that, in a saddle-ride type vehicle which includes a storage box which is supported on an upper portion of a vehicle body frame and has a bulging portion bulging downwardly, an engine which is arranged below the storage box and is supported on the vehicle body frame, a fuel tank which is arranged in front of the engine and stores fuel to be supplied to the engine therein, and a canister which is communicably connected to the fuel tank and collects fuel vaporized in the fuel tank, the engine is arranged behind the bulging portion in the vehicle longitudinal direction, and the fuel tank and the canister are arranged in front of the bulging portion in the vehicle longitudinal direction.

An embodiment of the invention is characterized in that, in a saddle-ride type vehicle which includes an engine which is supported on a vehicle body frame, a fuel tank which is arranged in front of the engine and is supported on the vehicle body frame, and a canister which is communicably connected to the fuel tank and collects fuel vaporized in the fuel tank, the fuel tank and the engine are arranged in a spaced-apart manner in the vehicle longitudinal direction, and the canister is arranged in front of a rear end portion of the fuel tank, as viewed in a side view of the vehicle.

An embodiment of the invention is characterized in that, in a saddle-ride type vehicle which includes a storage box which is supported on an upper portion of a vehicle body frame, an engine which is arranged below the storage box and is supported on the vehicle body frame, a fuel tank which stores fuel to be supplied to the engine therein, and a canister which is communicably connected to the fuel tank and collects fuel vaporized in the fuel tank, the canister is arranged in a space surrounded by the storage box and the fuel tank, as viewed in a side view of a vehicle.

An embodiment of the invention is characterized in that at least a portion of the canister is arranged within a vertical height of the fuel tank, as viewed in a side view of the vehicle.

An embodiment of the invention is characterized in that the canister is arranged above the fuel tank so as to fall within a lateral width of the fuel tank, as viewed in a plan view of the vehicle.

An embodiment of the invention is characterized in that a fuel pump for pumping fuel in the fuel tank to the engine is mounted on the fuel tank, and the canister is arranged to overlap with the fuel pump, as viewed in a plan view of the vehicle.

An embodiment of the invention is characterized in that the canister is supported on a support portion formed on a lower surface of the storage box.

An embodiment of the invention is characterized in that a recessed portion which is indented upwardly is formed on a lower surface of the storage box, the support portion is arranged in the recessed portion, and the canister is arranged along the recessed portion.

An embodiment of the invention is characterized in that the engine is a unit-swing-type engine which is swingably supported on the vehicle body frame, an air cleaner is arranged above the unit-swing-type engine, and the canister is arranged such that at least a portion of the canister falls below an intake air outlet of the air cleaner and above an intake air inlet of the unit-swing-type engine, as viewed in a side view of the vehicle.

According to an embodiment of the invention, the engine is arranged behind the bulging portion in the vehicle longitudinal direction, and the fuel tank and the canister are arranged in front of the bulging portion, in the vehicle longitudinal direction. That is, the fuel tank and the canister are arranged with respect to the engine such that the bulging portion of the storage box is sandwiched between the fuel tank/canister and the engine. It is possible to arrange the canister away from the engine by a distance corresponding to the bulging portion and hence, it is possible to reduce heat from the engine exerted on the canister.

According to an embodiment of the invention, the fuel tank and the engine are arranged in a spaced-apart manner in the vehicle longitudinal direction, and the canister is arranged in front of a rear end portion of the fuel tank, as viewed in a side view of the vehicle. Due to such a construction, the canister is also arranged away from the engine. Accordingly, the canister can be arranged away from the engine and hence, it is possible to reduce the influence of heat from the engine exerted on the canister.

According to an embodiment of the invention, the canister is arranged in a space surrounded by the storage box and the fuel tank, as viewed in a side view of a vehicle. That is, the canister is arranged in the space and hence, it is possible to reduce the influence of heat from the engine exerted on the canister.

According to an embodiment of the invention, at least a portion of the canister is arranged within a vertical height of the fuel tank, as viewed in a side view of the vehicle. Due to such a construction, it is possible to arrange the canister close to the fuel tank. By arranging the canister close to the fuel tank, it is possible to shorten a pipe length of a pipe which communicably connects the canister and the fuel tank.

According to an embodiment of the invention, the canister is arranged above the fuel tank so as to fall within a lateral width of the fuel tank, as viewed in a plan view of the vehicle. Due to such a construction, it is possible to arrange the canister closer to the fuel tank. By arranging the canister closer to the fuel tank, it is possible to further shorten the pipe length of the pipe.

According to an embodiment of the invention, the canister is arranged to overlap with the fuel pump, as viewed in a plan view of the vehicle. Due to such a construction, it is possible to arrange the canister close to the fuel pump. Accordingly, it is possible to arrange a pipe which feeds fuel to the engine from the canister in a state that the pipe is arranged in bundles with the pipe which feeds fuel to the engine from the fuel pump and hence, piping can be simplified.

According to an embodiment of the invention, the canister is supported on a support portion formed on a lower surface of the storage box. By allowing the support portion to support the canister preliminarily before the storage box is assembled into the vehicle body frame, it is possible to arrange the canister simultaneously with assembling of the storage box. That is, it is possible to shorten an assembling time on a production line, thus enhancing the production efficiency of the saddle-ride type vehicle.

According to an embodiment of the invention, the canister is arranged along the recessed portion. That is, most of the canister is surrounded by the recessed portion. Since the recessed portion performs heat insulation, the influence of heat from the engine exerted on the canister can be further reduced.

According to an embodiment of the invention, the canister is arranged such that at least the portion of the canister falls below an intake air outlet of the air cleaner and above the intake air inlet of the unit-swing-type engine, as viewed in a side view of the vehicle. That is, the canister is arranged such that the canister is positioned as high as an intake path. Due to such a construction, pipes for feeding fuel to the intake path from the canister can be simplified, thus shortening a length of the pipe.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the invention is described in conjunction with attached drawings hereinafter. Here, the drawings are viewed in the direction of numerals.

Figure 1:
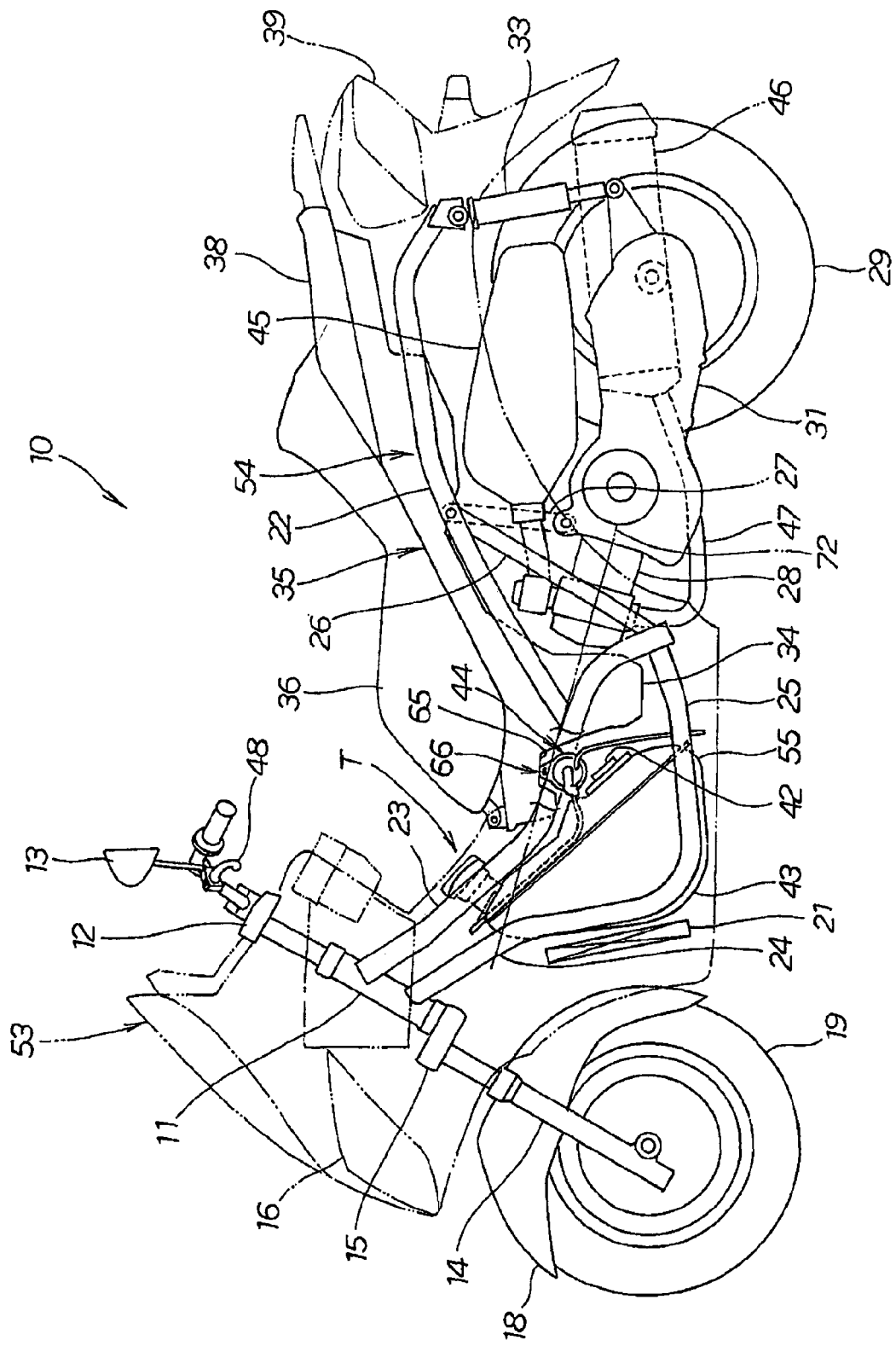
FIG. 1 is a left side view of a saddle-ride type vehicle according to the present invention.

FIG. 1 is a left side view of a saddle-ride type vehicle according to the present invention. The saddle-ride type vehicle is constituted of a handle 12 which is steerably mounted on a head pipe 11, a side mirror 13 which is raised up from the handle 12, a handle stem 15 which is mounted on a lower end of the head pipe 11 and supports a front fork 14, a front lamp 16 which is arranged in front of the handle stem 15 and emits light toward a vehicle-body front side, a front wheel 19 which is supported on the front fork 14 and has a portion thereof covered with a front fender 18, a main frame 23 which extends in the downward and rearward direction from the head pipe 11, a down tube 24 which is mounted on the head pipe 11 together with the main frame 23 and is downwardly suspended from the head pipe 11, a lower pipe 25 which extends in the vehicle rearward direction from a lower end of the down tube 24, a stay 26 which extends toward a rear frame 22 from a rear end of the main frame 23, a unit-swing type engine 28 which is swingably supported on the rear frame 22 by way of a link 27, a power transmission mechanism 31 which is arranged behind the engine 28 and transmits power of the engine 28 to a rear wheel 29, a rear cushion 33 which extends toward a rear end of the power transmission mechanism 31 from a rear end of the rear frame 22, a storage box 35 which is supported on the main frame 23 and the rear frame 22 and has a bulging portion 34 which bulges downwardly, a front seat 36 which is arranged on an upper portion of the storage box 35 and on which the rider sits, a rear seat 38 which is arranged behind the front seat 36 and on which a pillion sits, a tail lamp 39 which is arranged behind the rear seat 38 and emits light when braking is performed, a fuel tank 43 which is supported on the down tube 24 and the lower pipe 25 and includes a fuel pump 42 for sucking fuel, a canister 44 which is arranged above the fuel tank 43 and collects fuel vaporized in the fuel tank 43, a radiator 21 which is arranged in front of the fuel tank 43 and is provided for cooling water which is heated by the engine 28, an air cleaner 45 which is arranged above the engine 28 and is provided for feeding air to the engine 28, an exhaust pipe 47 which extends toward a muffler 46 from a lower portion of the engine 28 and is provided for discharging an exhaust gas, a brake lever 48 which is mounted on the handle 12 for controlling braking of the rear wheel 29, and a vehicle-body cover 53 which covers the vehicle body and is indicated by an imaginary line.

The fuel tank 43 is arranged in a space surrounded by the main frame 23, the down tube 24 and the lower pipe 25 in a state that the fuel tank 43 extends in the direction from a front upper side to a rear lower side in the drawing.

A vehicle-body frame 54 is constituted of the head pipe 11, the main frame 23, the rear frame 22, the down tube 24, the lower pipe 25 and the stay 26.

That is, the saddle-ride type vehicle 10 can be summarized as follows.

In the saddle-ride type vehicle 10 which includes the storage box 35 which is supported on the upper portion of the vehicle-body frame 54 and has the bulging portion 34 bulging downwardly, the engine 28 which is arranged below the storage box 35 and is supported on the vehicle-body frame 54, the fuel tank 43 which is arranged in front of the engine 28 and stores fuel supplied to the engine 28, and the canister 44 which is communicably connected to the fuel tank 43 and collects fuel vaporized in the fuel tank 43, the engine 28 is arranged behind the bulging portion 34 in the vehicle longitudinal direction, and the fuel tank 43 and the canister 44 are arranged in front of the bulging portion 34 in the vehicle longitudinal direction.

The fuel tank 43 and the canister 44 are arranged with respect to the engine 28 such that the bulging portion 34 of the storage box 35 is sandwiched between the fuel tank 43/canister 44 and the engine 28. It is possible to arrange the canister 44 away from the engine by a distance corresponding to the bulging portion 34 and hence, it is possible to reduce influence of heat from the engine 28 exerted on the canister 44.

Further, according to the saddle-ride type vehicle 10, the fuel tank 43 is supported on the down tube 24 and the lower pipe 25, and the engine 28 is supported on the rear frame 22 by way of the link 27. That is, the fuel tank 43 and the engine 28 are arranged in a spaced-apart manner.

Due to such a constitution, the saddle-ride type vehicle 10 is also summarized as follows.

In the saddle-ride type vehicle 10 which includes the engine 28 which is supported on the vehicle-body frame 54, the fuel tank 43 which is arranged in front of the engine 28 and is supported on the vehicle-body frame 54, and the canister 44 which is communicably connected to the fuel tank 43 and collects the fuel vaporized in the fuel tank 43, the fuel tank 43 and the engine 28 are arranged in a spaced-apart manner in the vehicle longitudinal direction, and the canister 44 is arranged in front of a rear end portion 55 of the fuel tank 43 as viewed in a side view of the vehicle.

According to the saddle-ride type vehicle 10, the fuel tank 43 and the engine 28 are arranged in a spaced apart manner in the vehicle longitudinal direction, and the canister 44 is arranged in front of the rear end portion 55 of the fuel tank 43 as viewed in a side view of the vehicle. Due to such a construction, the canister 44 is also arranged away from the engine 28. The canister 44 can be arranged away from the engine 28 and hence, it is possible to reduce influence of heat from the engine 28 exerted on the canister 44.

Figure 2:
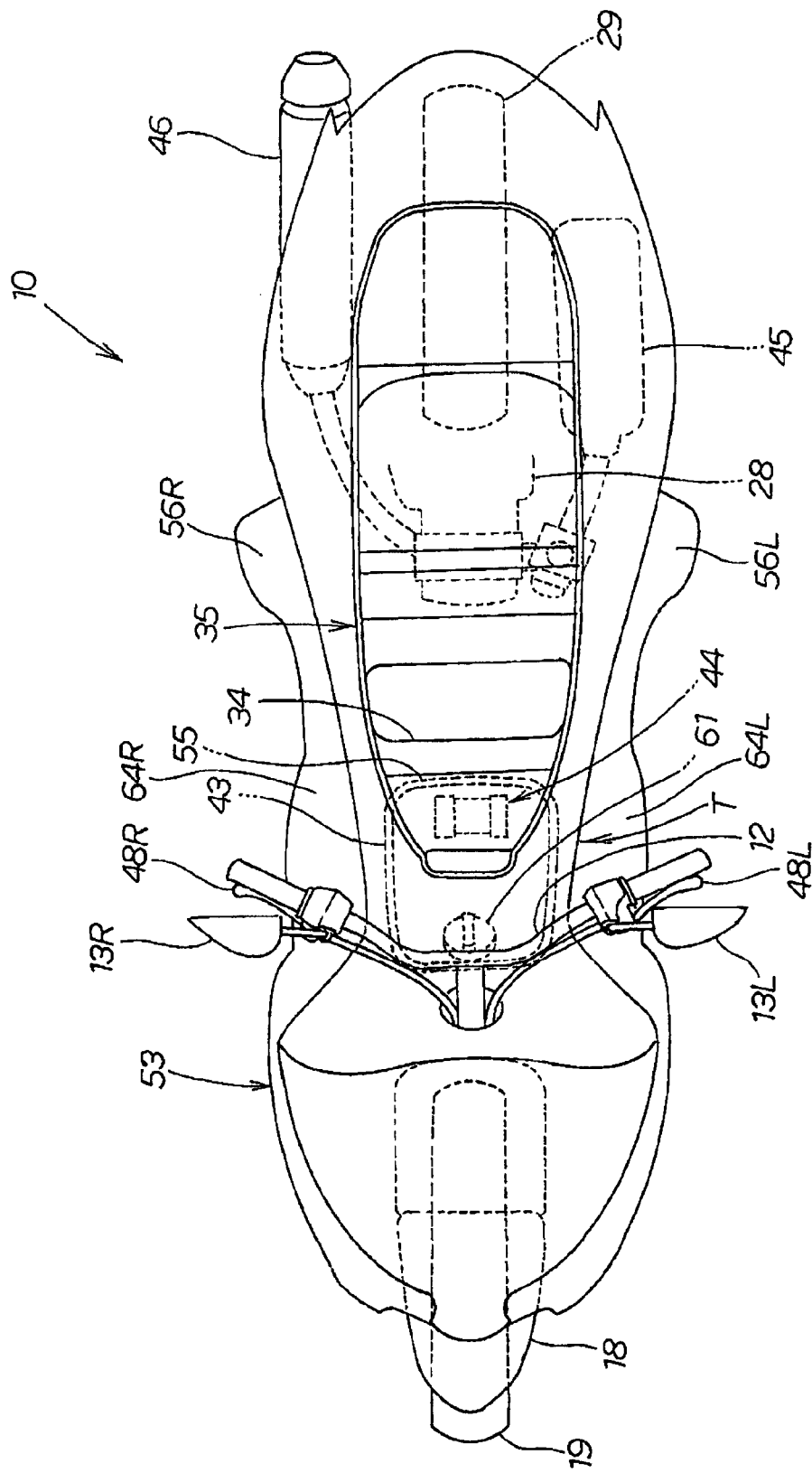
FIG. 2 is a top plan view of the saddle-ride type vehicle according to the present invention.

FIG. 2 is a top, plan view of the saddle-ride type vehicle according to the present invention. In FIG. 2, for the sake of brevity, a front seat and a rear seat (numerals 36, 38 in FIG. 1) are removed from the vehicle.

Here, in the drawing, symbol L is a suffix indicating a left side of a rider, and symbol R is a suffix indicating a right side of the rider.

The fuel tank 43 is arranged to allow a fuel feed port 61 through which fuel is filled to face a lower portion of the handle 12, and the engine 28 is arranged to allow a distal end of the engine 28 to face a position between rear steps 56L, 56R on which a pillion who sits on the rear seat (numeral 38 in FIG. 1) places his/her legs.

That is, the fuel tank 43 and the engine 28 are arranged in a spaced-apart manner in the vehicle longitudinal direction.

Further, the canister 44 is arranged such that the canister 44 is accommodated in a space above the fuel tank 43. That is, the canister 44 is arranged in front of the rear end portion 55 of the fuel tank 43 as viewed also in a plan view of the vehicle. Accordingly, the canister 44 can be arranged away from the engine 28.

According to the saddle-ride type vehicle 10, the fuel tank 43 and the engine 28 are arranged in a spaced apart manner in the vehicle longitudinal direction, and the canister 44 is arranged in front of the rear end portion 55 of the fuel tank 43 as viewed in a plan view of the vehicle.

Further, according to the saddle-ride type vehicle 10, a tunnel portion T projects upwardly from front steps 64L, 64R on which a rider who sits on the front seat (numeral 36 in FIG. 1) places his/her legs. The canister 44 is arranged between the front steps 64L, 64R as viewed in a plan view of the vehicle, and the fuel tank is arranged below the tunnel portion T as viewed in a plan view of the vehicle.

Next, a position where the canister is arranged with respect to the fuel tank is explained.

Figure 3A:
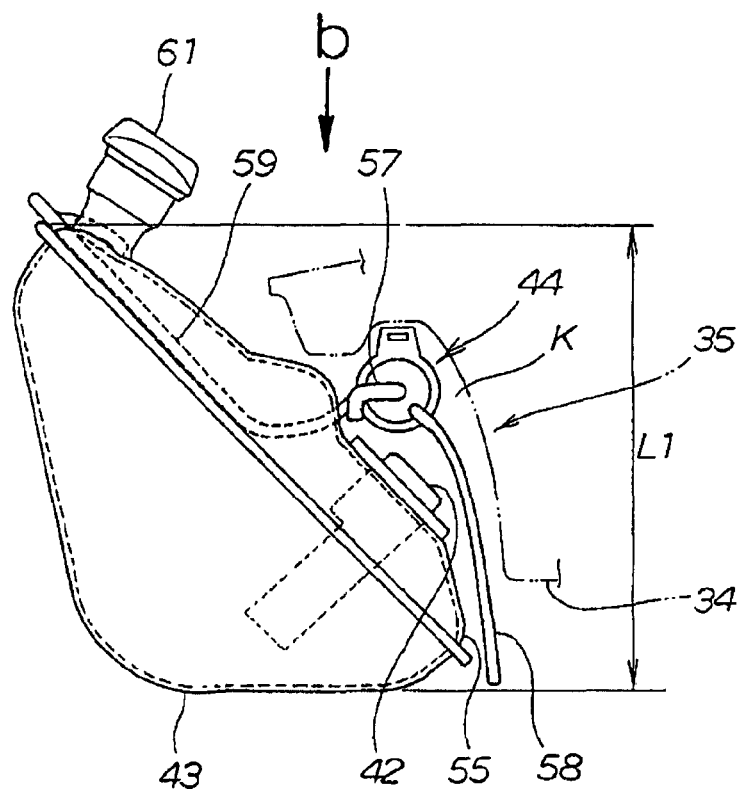
FIGS. 3A and 3B are views for explaining an arrangement position of a canister with respect to a fuel tank.
Figure 3B:
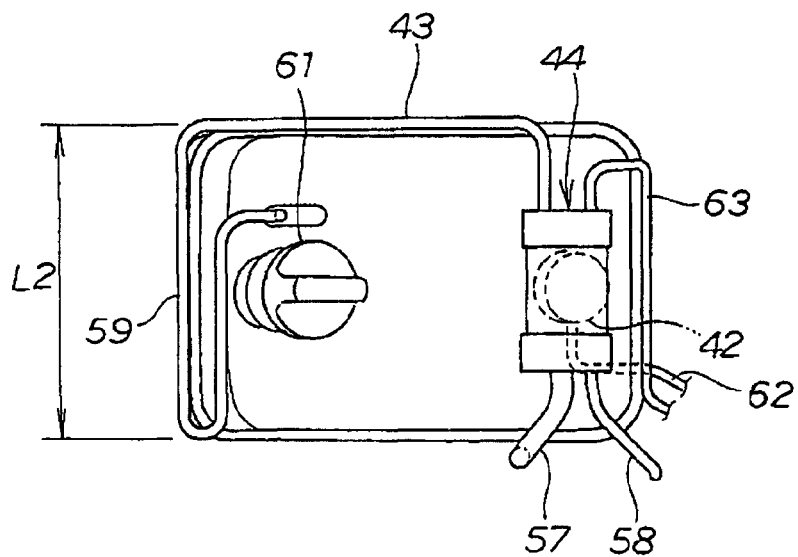

FIGS. 3A and 3B are views for explaining the arrangement position of the canister with respect to the fuel tank. As shown in FIG. 3A, the canister 44 is arranged in front of the rear end portion 55 of the fuel tank 43 as viewed in a side view of the vehicle, and is arranged within a vertical height L1 of the fuel tank 43 as viewed in a side view of the vehicle.

To the canister 44, an air pipe 57 for introducing air outside the canister 44 by suction, a drain pipe 58 for discharging moisture introduced into the canister 44 in a form that moisture is mixed into vaporized fuel, an introduction pipe 59 for introducing fuel vaporized in the fuel tank 43 into the canister 44, and an vaporized fuel feed pipe (numeral 63 in FIG. 3B) for feeding fuel toward the engine (numeral 28 in FIG. 1) from the canister 44 are communicably connected.

A fuel feed port 61 for feeding fuel is arranged on an upper portion of the fuel tank 43.

At least a portion of the canister 44 is arranged within a vertical height L1 of the fuel tank 43 as viewed in a side view of the vehicle. Due to such a constitution, it is possible to arrange the canister 44 close to the fuel tank 43. By arranging the canister 44 close to the fuel tank 43, it is possible to shorten the length of the pipe (introduction pipe 59) which communicably connects the canister 44 and the fuel tank 43.

Further, the canister 44 is arranged in a space K surrounded by the storage box 35 and the fuel tank 43 as viewed in a side view of the vehicle. That is, the canister 44 is arranged in the space K and hence, it is possible to reduce influence of heat from the engine exerted on the canister.

FIG. 3B is a view as viewed in the direction indicated by an arrow b in FIG. 3A. In this drawing, the canister 44 is arranged above the fuel tank 43 so as to fall within a lateral width L2 of the fuel tank 43 as viewed in a top, plan view of the vehicle, and the canister 44 is also arranged to overlap with the fuel pump 42 as viewed in a plan view of the vehicle.

A liquid fuel feed pipe 62 for feeding liquid fuel in the fuel tank 43 to the engine (numeral 28 in FIG. 1) is communicably connected to the fuel pump 42.

The canister 44 is arranged above the fuel tank 43 so as to fall within a lateral width L2 of the fuel tank 43 as viewed in a plan view of the vehicle. Due to such a construction, it is possible to arrange the canister 44 closer to the fuel tank 43. Further, by arranging the canister 44 closer to the fuel tank 43, it is possible to further shorten the pipe length of the introduction pipe 59.

Further, the canister 44 is arranged to overlap with the fuel pump 42 as viewed in a plan view of the vehicle. Due to such a construction, it is possible to arrange the canister 44 close to the fuel pump 42. Accordingly, it is possible to arrange the vaporized fuel feed pipe 63 which feeds fuel to the engine 28 from the canister 44 in a state that the vaporized fuel feed pipe 63 is arranged in bundles with the liquid fuel feed pipe 62 which feeds fuel to the engine 28 from the fuel pump 42 and hence, piping can be simplified.

Next, the support structure of the canister is explained.

Figure 4A:
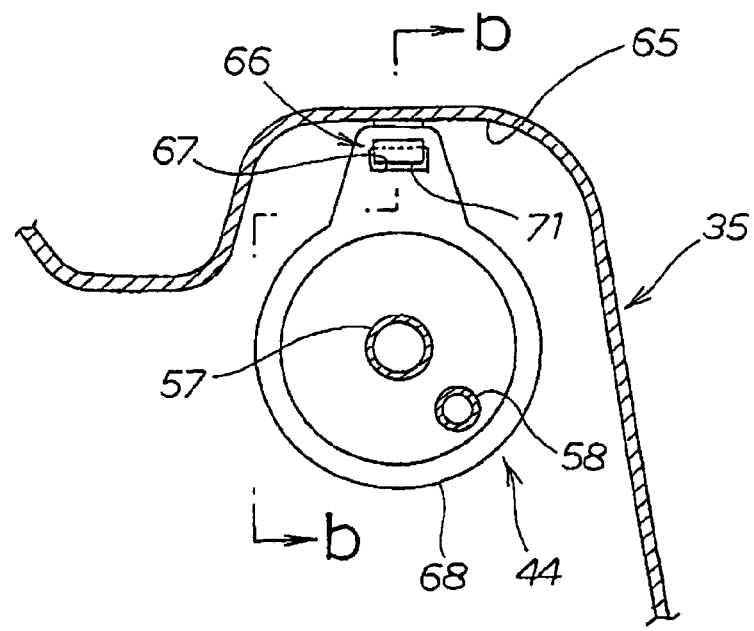
FIGS. 4A and 4B are views for explaining the support structure of the canister.
Figure 4B:
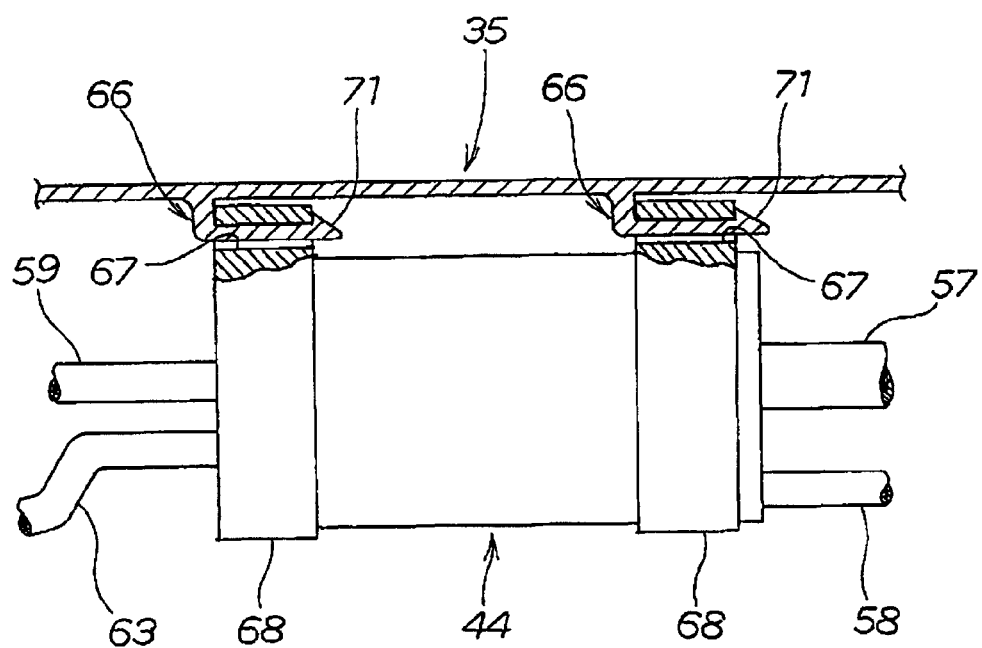

FIGS. 4A and 4B are views for explaining the support structure of the canister. As shown in FIG. 4A, a recessed portion 65 which is indented upwardly is formed on a lower surface of the storage box 35, a support portion 66 is arranged in the recessed portion 65, and the canister 44 is arranged along the recessed portion 65.

The canister 44 is arranged along the recessed portion 65. That is, a most portion of the canister 44 is surrounded by the recessed portion 65. Since the recessed portion 65 performs heat insulation, influence of heat from the engine (numeral 28 in FIG. 1) exerted on the canister 44 can be further reduced.

The support structure of such a canister is explained in further detail in conjunction with FIG. 4B.

FIG. 4B is a cross-sectional view taken along a line b-b in FIG. 4A, wherein elastic mounting members 68 which are arranged in a fitting manner and have holes 67 therein are mounted on the canister 44. On the other hand, on a lower surface of the storage box 35, the L-shaped support portions 66 having inverse hook portions 71 on distal ends thereof are arranged for preventing the movement of the canister 44.

The canister 44 is supported on the support portion 66 formed on a lower surface of the storage box 35. By allowing the support portion 66 to support the canister 44 preliminarily before the storage box 35 is assembled into the vehicle body frame (numeral 54 in FIG. 1), it is possible to arrange the canister 44 simultaneously with assembling of the storage box 35. That is, it is possible to shorten an assembling time on a production line thus enhancing the production efficiency of the saddle-ride type vehicle.

In addition to the above-mentioned constitution, the support portion 66 is formed in an L-shape, and the canister 44 is supported by inserting the support portion 66 into the hole 67. With such a simple constitution, it is possible to reduce the number of parts so that a saddle-ride type vehicle can be manufactured at a low cost.

Next, the arrangement position of the canister with respect to the engine is explained.

Figure 5:
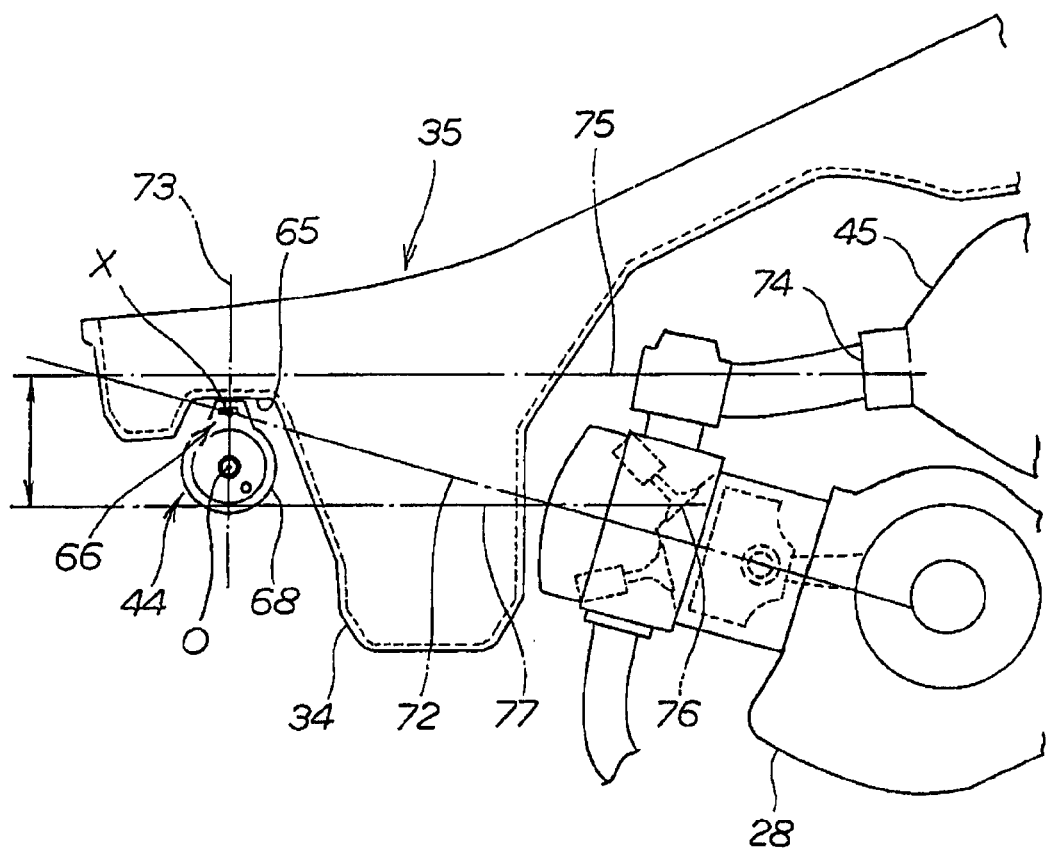
FIG. 5 is a view for explaining an arrangement position of the canister with respect to an engine.

FIG. 5 is a view for explaining the arrangement portion of the canister 44 with respect to the engine. The canister 44 is supported on the storage box 35. The canister 44 is arranged such that a center point O of the canister 44 assumes a position below an intersecting point X between a cylinder axis 72 of the engine 28 and a center line 73 drawn in the vertical direction from the center point O of the canister 44.

That is, in this embodiment, the canister 44 is arranged between the engine 28 and the fuel tank (numeral 43 in FIG. 1) and below the storage box 35 and, at the same time, the canister 44 is arranged such that the center O of the canister 44 is positioned below the cylinder axis 72 of the engine 28 as viewed in a side view of the vehicle.

The canister 44 is arranged below the storage box 35 and, at the same time, the canister 44 is arranged such that the center O of the canister 44 is positioned below the cylinder axis 72 of the engine 28 as viewed in a side view of the vehicle. A region which is below the storage box 35 and below the cylinder axis 72 inevitably assumes a position away from the engine 28. That is, by arranging the canister 44 away from the engine 28, it is possible to reduce influence of heat from the engine 28 exerted on the canister 44.

Further, the canister 44 is arranged such that the center point O is arranged below an intake air outlet line 75, which is drawn in the horizontal direction from the center of an intake air outlet 74 of the air cleaner 45, and above an intake air inlet line 77, which is drawn in the horizontal direction from the center of an intake air inlet 76 of the engine 28.

That is, the canister 44 is arranged such that at least a portion of the canister 44 falls below the intake air outlet 74 of the air cleaner 45 and above the intake air inlet 76 of the engine 28 as viewed in a side view of the vehicle. That is, the canister 44 is arranged such that the canister 44 is positioned approximately as high as an intake path (path ranging from the intake air outlet 74 to the intake air inlet 76). Due to such a construction, the pipes (numerals 62, 63 in FIG. 2B) for feeding fuel to the intake path from the canister 44 can be simplified thus shortening lengths of the pipes.

The engine according to the present invention has been explained by taking a unit-swing-type engine as an example. However, even in an engine which is fixedly supported on a frame, by arranging a canister away from the engine, a saddle-ride type vehicle can acquire an advantageous effect of the present invention that influence of heat from the engine exerted on the canister can be reduced. That is, the engine is not limited to the unit-swing-type engine.

The saddle-ride type vehicle of the present invention is preferably applicable to an automatic motorcycle such as a big scooter.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A saddle-ride type vehicle, comprising:
   an engine supported on a vehicle body frame;
   a fuel tank disposed in front of said engine, said fuel tank being supported on the vehicle body frame; and
   a canister communicably connected to said fuel tank, said canister collecting fuel vaporized in said fuel tank,
   wherein said fuel tank and said engine are disposed in a spaced-apart manner, in a vehicle longitudinal direction;
   wherein said canister is disposed in front of a rear end portion of said fuel tank, as viewed in a side view of the vehicle; and
   wherein at least a portion of said canister is disposed within a vertical height of said fuel tank, as viewed in the side view of the vehicle.

2. The saddle-ride type vehicle according to claim 1, wherein said canister is disposed above said fuel tank so as to be within a lateral width of said fuel tank, as viewed in a top, plan view of the vehicle.

3. The saddle-ride type vehicle according to claim 2, further comprising a fuel pump which pumps fuel in said fuel tank to said engine, said fuel pump being mounted on said fuel tank,
   wherein said canister is disposed so as to overlap with said fuel pump, as viewed in the top, plan view of the vehicle.

4. A saddle-ride type vehicle, comprising:
   a storage box supported on an upper portion of a vehicle body frame, said storage box including a bulging portion bulging downwardly;
   an engine disposed below said storage box, said engine being supported on the vehicle body frame;
   a fuel tank disposed in front of said engine, said fuel tank storing therein fuel to be supplied to said engine; and
   a canister communicably connected to said fuel tank, said canister collecting fuel vaporized in said fuel tank,
   wherein said engine is disposed behind said bulging portion of said storage box, in a vehicle longitudinal direction,
   wherein said fuel tank and said canister are disposed in front of said bulging portion of said storage box, in the vehicle longitudinal direction; and
   wherein at least a portion of said canister is disposed within a vertical height of said fuel tank, as viewed in a side view of the vehicle.

5. The saddle-ride type vehicle according to claim 4, wherein said canister is disposed above said fuel tank so as to be within a lateral width of said fuel tank, as viewed in a top, plan view of the vehicle.

6. The saddle-ride type vehicle according to claim 5, further comprising a fuel pump which pumps fuel in said fuel tank to said engine, said fuel pump being mounted on said fuel tank,
   wherein said canister is disposed so as to overlap with said fuel pump, as viewed in the top, plan view of the vehicle.

7. The saddle-ride type vehicle according to claim 6,
   wherein said storage box includes a support portion formed on a lower surface thereof, and
   wherein said canister is supported on said support portion of said storage box.

8. The saddle-ride type vehicle according to claim 7,
   wherein said storage box includes a recessed portion which is indented upwardly on the lower surface of said storage box, wherein said support portion is disposed in said recessed portion, and wherein said canister is disposed along said recessed portion.

9. The saddle-ride type vehicle according to claim 8, wherein said engine is a unit-swing-type engine which is swingably supported on the vehicle body frame, wherein an air cleaner is disposed above said unit-swing-type engine, and wherein said canister is disposed such that at least a portion of said canister is below an intake air outlet of said air cleaner and above an intake air inlet of said unit-swing-type engine, as viewed in the side view of the vehicle.

10. The saddle-ride type vehicle according to claim 8, wherein said support portion includes a hook attachable to holes formed in an elastic mounting member of said canister.

11. The saddle-ride type vehicle according to claim 7, wherein said support portion includes a hook attachable to holes formed in an elastic mounting member of said canister.

12. A saddle-ride type vehicle, comprising:

a storage box supported on an upper portion of a vehicle body frame;

an engine disposed below said storage box, said engine being supported on the vehicle body frame;

a fuel tank storing therein fuel to be supplied to said engine; and a canister communicably connected to said fuel tank, said canister collecting fuel vaporized in said fuel tank, wherein said canister is disposed in a space surrounded by said storage box and said fuel tank, as viewed in a side view of a vehicle, and wherein at least a portion of said canister is disposed within a vertical height of said fuel tank, as viewed in the side view of the vehicle.

13. The saddle-ride type vehicle according to claim 12, wherein said canister is disposed above said fuel tank so as to be within a lateral width of said fuel tank, as viewed in a top, plan view of the vehicle.

14. The saddle-ride type vehicle according to claim 13, further comprising a fuel pump which pumps fuel in said fuel tank to said engine, said fuel pump being mounted on said fuel tank, herein said canister is disposed so as to overlap with said fuel pump, as viewed in the top, plan view of the vehicle.

15. The saddle-ride type vehicle according to claim 14, wherein said storage box includes a support portion formed on a lower surface thereof, and wherein said canister is supported on said support portion of said storage box.

16. The saddle-ride type vehicle according to claim 15, wherein said storage box includes a recessed portion which is indented upwardly on the lower surface of said storage box, wherein said support portion is disposed in said recessed portion, and wherein said canister is disposed along said recessed portion.

17. The saddle-ride type vehicle according to claim 15, wherein said support portion includes a hook attachable to holes formed in an elastic mounting member of said canister.

\* \* \* \* \*